March 29, 1960     J. J. LOWE     2,930,479
RIBBON PACKAGE

Filed Oct. 13, 1958     5 Sheets-Sheet 1

INVENTOR
JOHN J. LOWE

BY Cushman, Darby & Cushman
ATTORNEYS

March 29, 1960 J. J. LOWE 2,930,479
RIBBON PACKAGE
Filed Oct. 13, 1958 5 Sheets-Sheet 2
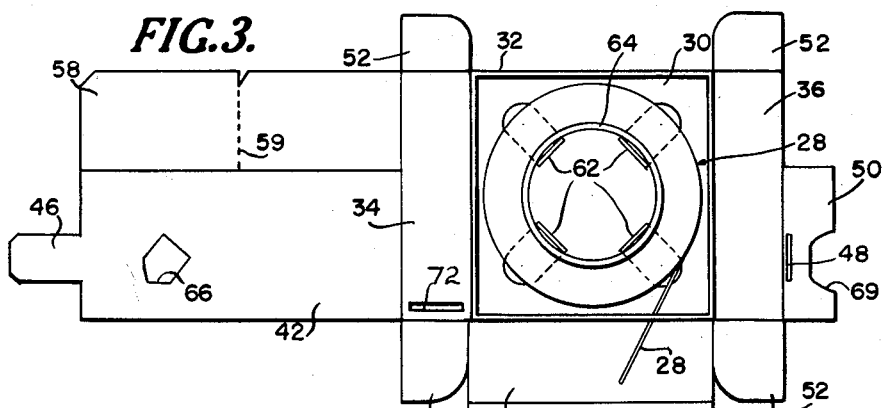
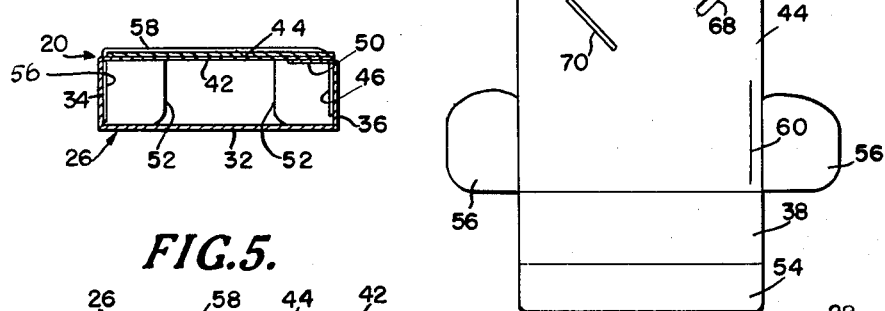
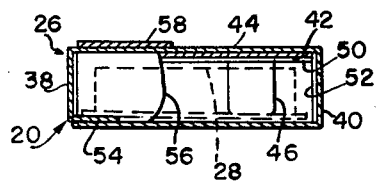
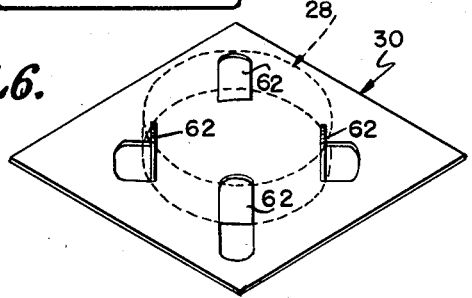
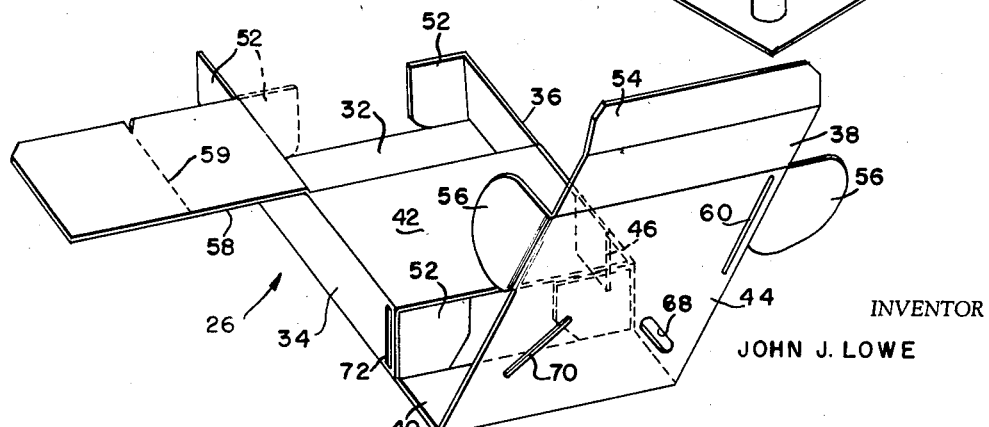
INVENTOR
JOHN J. LOWE
BY
Cushman, Darby & Cushman
ATTORNEYS March 29, 1960 J. J. LOWE 2,930,479
RIBBON PACKAGE
Filed Oct. 13, 1958 5 Sheets-Sheet 3

INVENTOR
JOHN J. LOWE

BY Cushman, Darby & Cushman
ATTORNEYS

March 29, 1960 J. J. LOWE 2,930,479
RIBBON PACKAGE
Filed Oct. 13, 1958 5 Sheets-Sheet 4
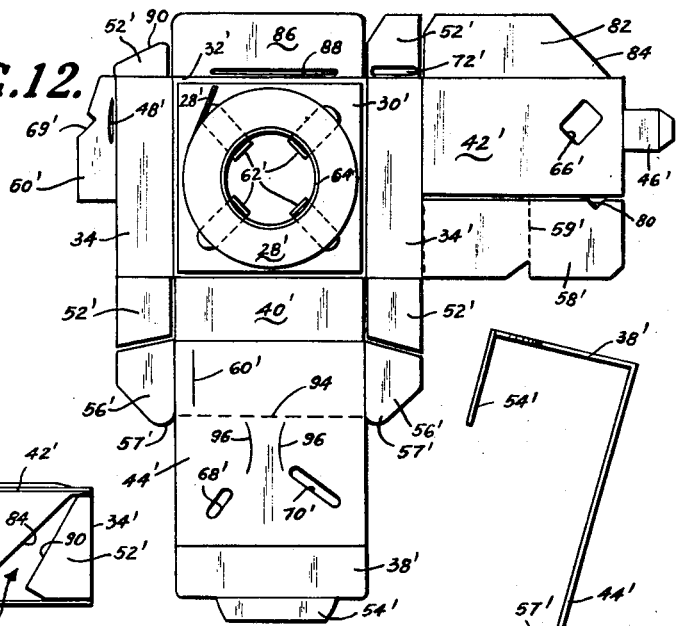
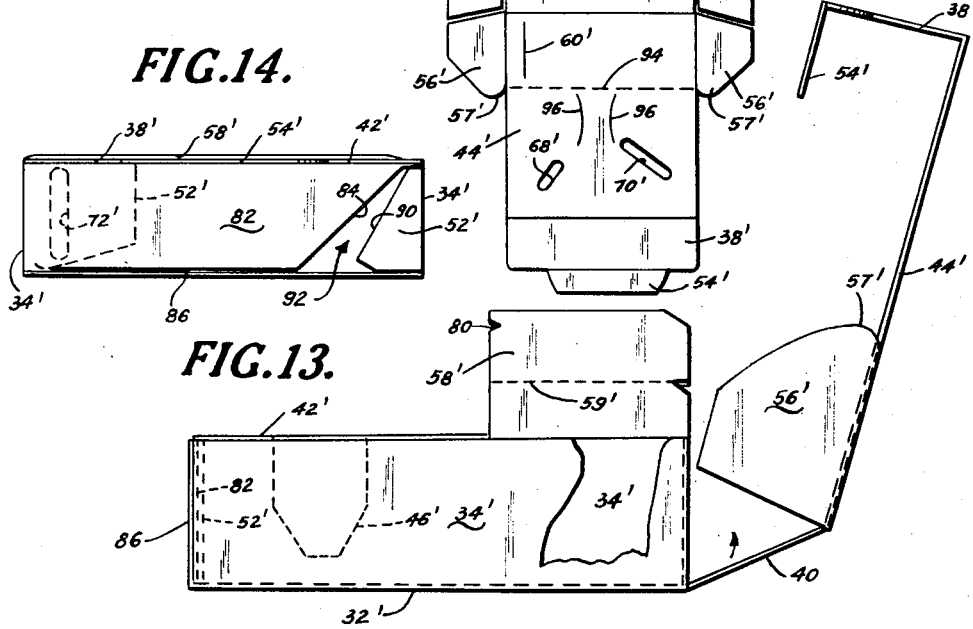
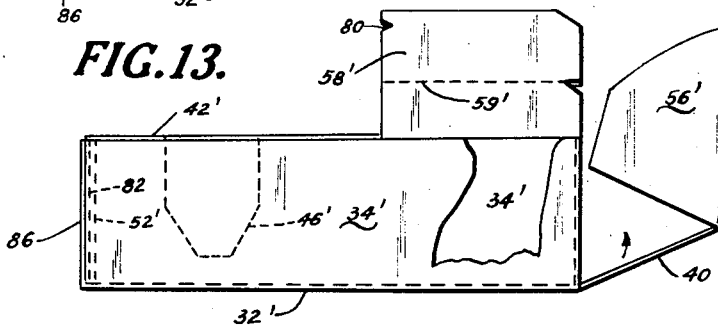
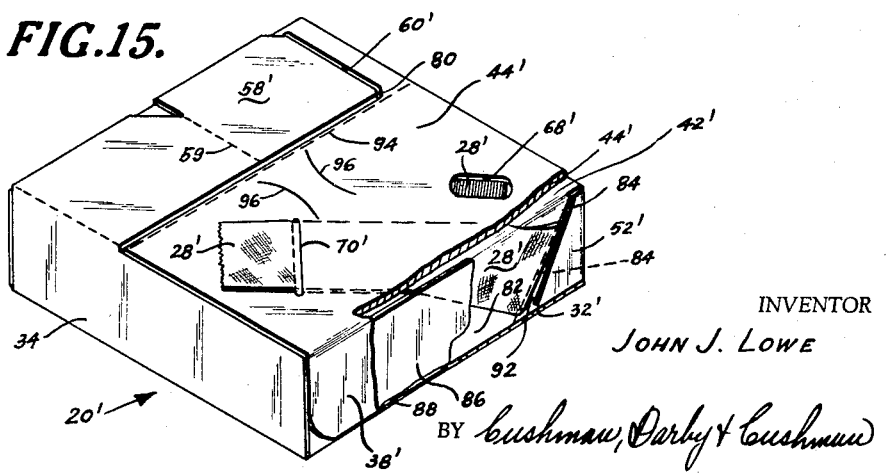
INVENTOR
JOHN J. LOWE
BY Cushman, Darby & Cushman
ATTORNEYS March 29, 1960 J. J. LOWE 2,930,479
RIBBON PACKAGE
Filed Oct. 13, 1958 5 Sheets-Sheet 5

INVENTOR
JOHN J. LOWE
BY Cushman, Darby & Cushman
ATTORNEYS

United States Patent Office 2,930,479
Patented Mar. 29, 1960

2,930,479

RIBBON PACKAGE

John J. Lowe, South Hill, Va., assignor to Burlington Industries, Inc., Greensboro, N.C., a corporation of Delaware Application October 13, 1958, Serial No. 766,792

15 Claims. (Cl. 206—52)

This application is a continuation-in-part of my copending application Serial No. 703,425, now abandoned. This invention relates to packages and in particular to packages for displaying and dispensing narrow fabrics or strip materials, such as ribbons or the like. For convenience and for the purpose of the present disclosure, the term "ribbon" will be sometimes used to designate such materials, it being understood that when so used, said term is intended to embrace all other similar and equivalent materials.

Display and dispensing packages, of the type referred to, commonly may be arranged in a plurality of individual compartments on a table or counter in retail stores or the like. When so arranged, space considerations usually require the package to be of relatively compact size; while, on the other hand, the package should be large enough that a sufficient supply of ribbon may be contained therein for convenient display and dispensing. Packages of this general type have been heretofore proposed, and it is an important object of this invention to provide a new and improved package of this type, of simplified and superior construction, more compact in size and particularly adapted to facilitate the display and dispensing of the ribbon.

A further object is to provide a novel package, of the type referred to, of inexpensive yet sturdy construction containing a roll of ribbon or the like and having means allowing the ribbon to be dispensed smoothly and efficiently.

Another object resides in the provision of novel means for supporting a roll of ribbon or the like and especially suited for installation in a display and dispensing package of the type referred to.

Still another object resides in the provision of a display and dispensing package, of the type referred to, including a novel combination of container or box structure and roll supporting means facilitating ribbon filling and replacement operations as well as display and dispensing operations.

It is desirable from the standpoints of space consideration, economy, and convenience and ease of handling, that the ribbon or other narrow material, to be carried by the package, be in roll or spool form, e.g., wound on a hollow core of approximately the same width as the width of the ribbon. The construction of conventional compartmented counters in retail stores usually makes it desirable for the package to be relatively shallow, and for the ribbon to be dispensed from the package through a dispensing slot in the top wall of the package. In other words, it is advantageous to have the ribbon on a roll arranged horizontally within the package for rotation about a vertical axis, with the ribbon dispensable vertically through the top wall of the package. As is evident, the 90° change in direction of the ribbon is apt to cause twisting as the ribbon is progressively withdrawn from the package.

Accordingly, it is a still further object of the invention to design a simplified and inexpensive display and dispensing package, of the aforementioned type, particularly adapted to rotatably mount a roll of ribbon or the like in horizontal position therein whereby the ribbon may be progressively withdrawn vertically from the package with no danger of twisting. A related object is to design the package so that the ribbon may be alternatively withdrawn therefrom laterally, or through a side or end wall, if desired.

Further objects and advantages of the invention will be in part obvious and in part pointed out hereinafter.

The novel features of the invention may be best made clear from the following description and accompanying drawings in which:

Figure 3 is a plan view of a roll of material and support therefor resting on a container blank adapted to be folded into a container or box to constitute the package of Figure 1;

Figure 4 is a vertical sectional view, on reduced scale, taken generally along line 4—4 of Figure 1, with the ribbon normally contained within the package not being shown, for the purpose of clarity of illustration;

Figure 5 is a vertical section view, on reduced scale, taken generally along line 5—5 of Figure 1 and with the roll of ribbon in the package being shown in phantom;

Figure 6 is a perspective view of an exemplary embodiment of the means for rotatably supporting the roll of ribbon or like material to be inserted into the package of Figure 1;

Figure 7 is a perspective view of the box formed from the blank illustrated in Figure 3, the box being shown in a partially opened position;

Figure 12 is a view corresponding to Figure 5 and showing a modification of the container blank;

Figure 13 is an enlarged side elevational view showing the blank of Figure 12 in a partially assembled position;

Figure 14 is an enlarged front end elevational view of a container formed from the blank of Figure 12 and with the front end flaps opened; and Figure 15 is a perspective and partially cutaway view of a package formed from the container blank of Figure 12;

Figure 1:
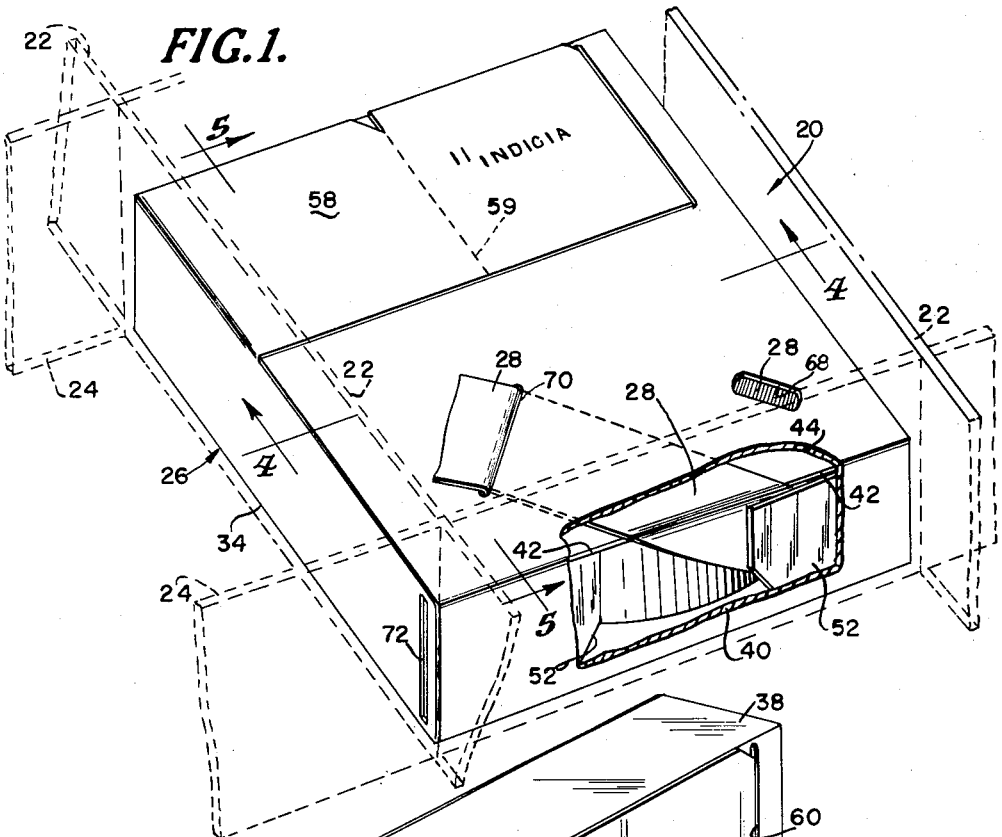
Figure 1 is a perspective and partially cutaway view of a package embodying the invention and shown in position in an exemplary display compartment, the latter being shown in phantom.

Referring now to the drawings and to the embodiment of the invention illustrated therein, numeral 20 designates the display and dispensing package, and as shown in Figure 1, this package may be arranged in one of a plurality of compartments defined by intersecting partition walls 22, 24. Conventionally, these walls may be made of glass and suitably constructed on a display counter (not shown) in a retail store. As will be more fully explained hereinafter, the package 20 contains a supply of narrow fabric or strip material, such as ribbon, and is so constructed that such material may be conveniently withdrawn therefrom to be displayed on the top of the package within the compartment and also to be dispensed or removed from the package, as desired. It should be evident that packages of this type when not disposed in the conventional display counters suggested in Figure 1 may be utilized in positions other than that shown in Figure 1. For example, under some circumstances the package may be arranged as suggested in Figure 2 wherein it is disposed in a position displaced 90° from the position illustrated in Figure 1. Other positions of use will be obvious.

Figure 2:
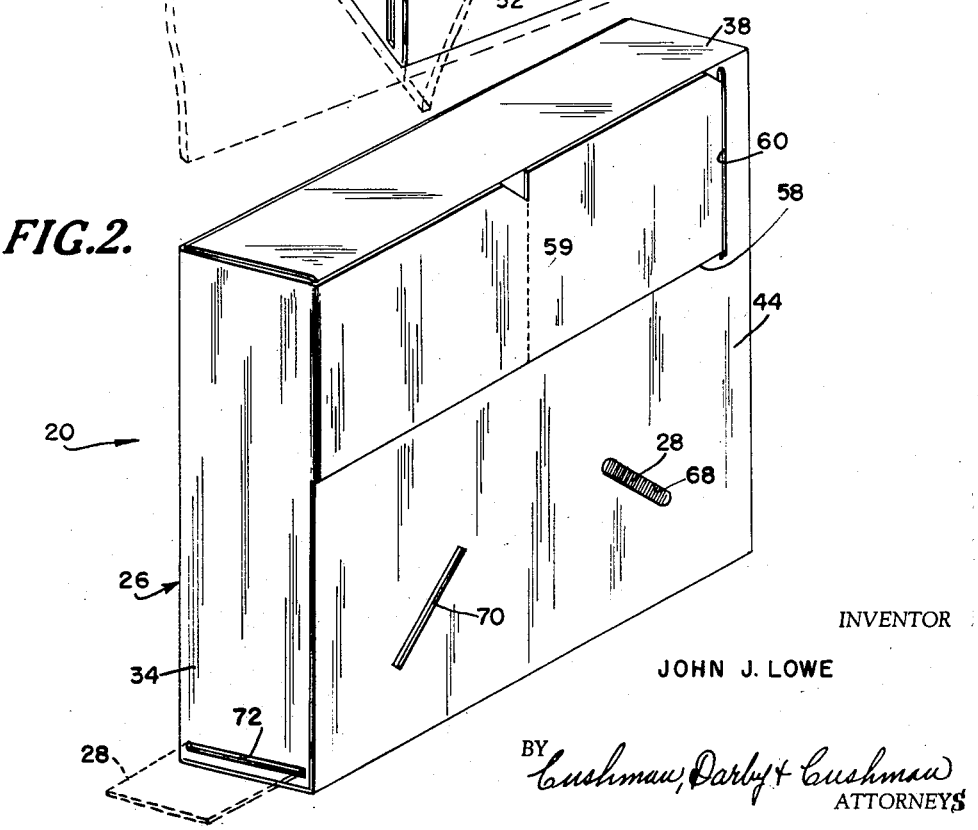
Figure 2 is another perspective view of the package of Figure 1, and showing it in a different position.

As shown in the illustrative embodiment, the package 20 comprises an outer box or container 26 preferably containing therein a roll 28 (Figures 3 and 6) of the desired material and a support means 30 for said roll. As best seen in Figures 1, 2 and 7, the illustrative embodiment of the box 26 includes a base wall 32, side walls 34, 36, end walls 38, 40, a first or minor top wall 42, and a second or main top wall 44. The box may be constructed of any suitable material, preferably an inexpensive material, such as cardboard or stiff paper, which will be somewhat flexible and resilient, even though relatively stiff. The box 26 may be formed from the blank illustrated in Figure 3.

In forming the box construction from the blank shown in Figure 3, the blank is folded along the lines indicated to dispose the various portions thereof in the positions indicated in Figures 1, 2 and 4–7. For example, the side walls 34, 36 may first be folded to vertical position, after which the first top wall 42 may be folded across the top of the box. Suitable means preferably are provided for engaging this top wall to the side walls. As shown, it is integrally and hingedly joined to the side wall 34 at one end and is provided at its free end with a tongue 46 adapted to be folded and detachably mounted in the slot 48 formed in the flap 50 arranged on the side wall 36 as shown in Figure 3 and adapted to be folded to a horizontal position, indicated in Figure 4. The function and purpose of this top wall 42 will be apparent as the description proceeds.

Each of the side walls 34, 36 may be formed with flaps 52 at the front and rear thereof, which are adapted to be folded inwardly as indicated in Figure 7, after which the rear end wall 40 may be folded upwardly and the top wall 44 folded over the top wall 42. The first top wall 42, as shown, covers only a portion of the area at the top of the box and ears 56 are formed on the sides of the top wall 44, at the front thereof, for resilient engagement to the interior of the front of the side walls 34, 36, as is evident. The front end wall 38 may then be folded downwardly and a flap 54 provided on the front end wall may then be folded for insertion into the box in resilient engagement with the inner surface of the base wall 32.

A flap 58 may be formed at the front of side wall 34, in the manner shown, for folding over the top wall 44 after the box is closed, and suitable means for retaining this flap 58 in such position is provided. Such means may take the form of a slit 60 formed in the top wall 44 as shown and into which the free end of flap 58 may be inserted as indicated in Figures 1 and 2. A transverse perforation 59 is formed at a suitable point in the flap 58 whereby a portion thereof may be conveniently detached from the box. The removable portion may be provided with suitable reordering indicia thereon whereby it can be forwarded to a manufacturer to facilitate reordering of a new package.

Turning now to the support 30 for the roll of ribbon or other material to be contained in the box 26, this support in the illustrative embodiment of Figure 6 is constructed of a planar base of rectangular outline preferably corresponding to the geometric outline of the base wall 32 of box 26. The support, as in the case of the box 26, may be made of any suitable material, preferably cardboard or stiff paper, and further includes a plurality of tabs 62. These tabs may be conveniently formed by punching out suitable areas in the base member and preferably they are so arranged that they lie along a circular path, as best indicated in Figure 3. Due to the relatively stiff but resilient nature of the cardboard or stiff material out of which support 30 is constructed, these punched out tabs 62 will be continuously urged radially outwardly from the circular outline circumscribing them. In other words, they will tend to return to their original positions due to their inherent resiliency and their hinged connection to the base member.

This characteristic of the tabs 62 is utilized to desirably retain the roll 28 on the support 30. This can be accomplished because conventional rolls 28 are usually formed by winding the ribbon or narrow material on a hollow core 64 of predetermined internal diameter. And the positioning of the tabs 62 is such that the circular outline circumscribing said tabs will be approximately of the same diameter as the inner diameter of the core 64. Thus, when assembling the roll 28 on the support 30, the tabs 62 are deformed radially inwardly as the core 64 is arranged on the support in the position illustrated, and the tabs will then be in suitable resilient engagement with the core to desirably hold the roll in position thereon while permitting rotation of the roll about a vertical axis and relative to the support.

The arrangement of the roll of the material 28 and the support 30 within the box 26 will be apparent from the drawings. Briefly, the support 30 with the roll may be positioned on the base wall 32 in alignment therewith, as best seen in Figure 3. This may be done before, during or after the forming of the blank of Figure 3 into the box, and the roll 28 will be disposed between the support 30 and the top walls 42, 44. Preferably, the front flap 54 will extend under the support 30 when the box is closed, as shown in Figure 5.

In order to permit the display and dispensing of the roll of material 28, it is contemplated that suitable dispensing opening means be provided in the box 26. If it is intended that the package 20 be arranged in an individual display compartment such as that previously discussed and suggested in Figure 1, it is preferred that a dispensing slot 70 be formed in the top wall 44 in the manner shown. In arranging the ribbon or narrow fabric for delivery from the roll 28 through this slot 70, the ribbon will pass from the roll through the rear opening formed between the top wall 42 and base wall 32, and it will then fold around and pass between the top wall 42 and top wall 44 and out the slot 70 (as shown in Figure 1). With this arrangement, it might be noted further that the ribbon or narrow fabric preferably should unwind from the roll 28 by leaving it in the tangential manner indicated in Figure 3. In other words, the point of tangency from which the ribbon leaves the roll should be on the side of the box opposite from the slot 70, if the slot is to be inclined in the manner illustrated. It will be understood, however, that the position and inclination of the slot 70 may be suitably altered or reversed whereby the roll of ribbon may be arranged on the support 30 so that the point of tangency where the ribbon leaves the roll is on the opposite side from that shown in Figure 3. If desired, more than one slot 70 may be formed in the top wall 44.

It has been found that the arrangement of the two top walls 42, 44 and the inclination of slot 70, together with the manner in which the roll 28 is mounted in the box, enable the ribbon to be desirably drawn or pulled vertically from the box (as in Figure 1) with no twist or other impediments to smooth and continous withdrawal being presented. It should be noted in this connection that the slot 70 preferably is inclined at approximately a right angle to the longitudinal axis of the ribbon as the latter passes between the top walls 42, 44 (see Figure 1).

It is also contemplated that the box 26 be further provided with an additional dispensing slot or slots whereby the ribbon may be dispensed from the box laterally. For example, a second dispensing slot 72 may be formed at the rear of side wall 34, as shown, the dispensing action through this slot being evident.

Suitable means for viewing the interior of the package may be provided. This means, as shown, includes openings 66, 68 arranged respectively in top walls 42, 44 for alignment when the box is closed. A cut-out portion 69 is also formed in flap 50 (Figure 3) for alignment with such openings.

Figure 8:
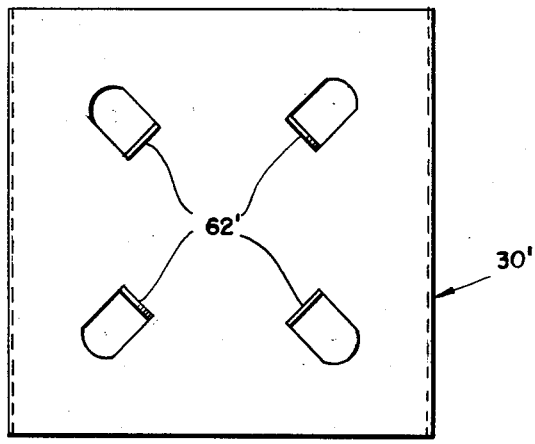
Figures 8 and 10 are plan views of modifications of the roll support of Figure 6.
Figure 9:
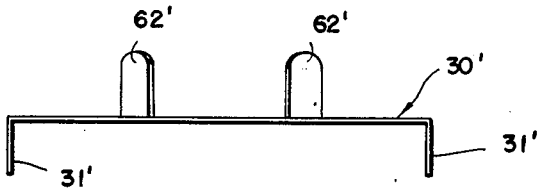
Figures 9 and 11 are end elevational views of the roll support respectively shown in Figures 8 and 10.

Modifications of the roll support 30 of Figure 6 are illustrated in Figures 8–11 wherein similar reference numerals have been used to designate like parts. In the embodiment of Figures 8, 9 the roll support 30' is substantially identical to that of Figure 6 and functions in the same manner, except that edge tabs 31' are provided along opposite edges (see Figure 9). As shown, only two such tabs are utilized and as is evident, they function when resting on bottom wall 42 of the box 26 to dispose the support base 30' closer to the top wall 44, whereby a roll of narrower ribbon mounted on tabs 62' may be inserted with the support into a box of the same size as that used for a wider ribbon mounted on support 30. If desired, tabs 31' may also be formed on the other two edges of the base 30'.

Figure 10:
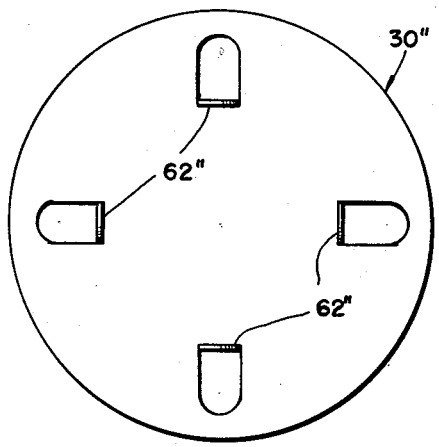
Figure 11:
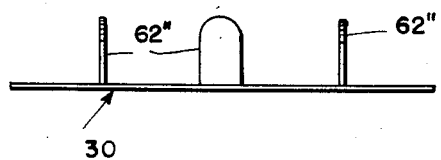

Referring now to the embodiment of Figures 10, 11 the support 30" is also of substantially identical construction to support 30, except that the base is circular, rather than square, with a diameter substantially equal to the length of a side of the base 30 so that it will fit in the same position in the box 26. With this embodiment, however, the bolt of ribbon 28 mounted on tabs 62" usually will not rotate relative to the tabs and support 30" during a dispensing operation, but usually will rotate as a unit with the support 30" and on or relative to the base wall 42 of the box. By reason of this construction, the frictional resistance to rotation of the ribbon roll 28 will be desirably at a minimum.

A modification of the container blank of Figure 3 is shown in Figure 12, wherein similar reference numerals have been used to designate similar parts. The modified container blank is shown in Figures 13 and 14 in partially assembled positions, while Figure 15 illustrates the completely assembled package 20'. It will be appreciated that package 20' will be used in the same manner and for the same purpose as package 20.

The package 20', as in the case of the package 20, is shown as including: main top wall 44'; a minor top wall 42'; base wall 32'; side walls 34'; flaps 52' formed at the ends of the side walls 34'; ears 56' formed on the top wall 44'; end walls 38', 40' formed on the top wall 44'; flap 54' formed on end wall 38'; flap 50' formed on one of the side walls 34' and having a slot 48' therein to receive the tongue 46' on the top wall 42'; reorder flap 58' formed on the side wall for engagement of its free end in the slit 60' in top wall 44', with a locking notch 80 provided in flap 58', as shown; dispensing slot 70' in top wall 44'; dispensing slot 72' in flap 52' at the front end of the package; and viewing openings 66', 68' and notch 69' formed respectively in the top wall 42', top wall 44' and flap 50'.

It will be noted that the locations for top wall 42' and flap 58' are shown on the blank in Figure 12 as being reversed from the positions of the corresponding parts of the blank of Figure 3, and are joined to the opposite side wall 34'. This requires positioning of the ears 56' adjacent the end wall 40', as best seen in Figure 12.

However, the main difference between the blanks shown in Figures 3 and 12 is the provision of a flap 82 along the forward edge of top wall 42' of the package 20'. This flap 82 has an inclined end 84, and as will be discussed in more detail hereinafter, it provides for a more gradual turning of the ribbon as it leaves the bolt for dispensing through the slot 70'.

An exemplary manner of assembling the container blank of Figure 12 will now be described. A bolt of ribbon 28' on a support 30, or any of the supports shown in Figures 8–11 may be placed on the base wall 32' either before, after or during the folding of the blank, as may be desirable, convenient or expedient. The sides 34' may then be folded upwardly to vertical position and the flap 50' and top wall 42' folded inwardly for insertion of tongue 46' in slot 48'. The rear flaps 52' (the ones adjacent ears 56') may then be folded inwardly and the rear end wall 40' and top wall 44' turned upwardly, through the position shown in Figure 13, after which the wall 44' will be folded to its horizontal position with ears 56' disposed between the rear edge of top wall 42' and the rear wall 40'. The curvature at 57' of ears 56' enables them to be lockingly engaged to the rear edge of the top wall 42', which edge will be disposed in the somewhat V-shaped notch formed at the point where the curved portion 57' is joined to top wall 44'.

The front flaps 52' may then be turned inwardly and the flap 82 turned downwardly. An end wall 86 is shown joined to the front of the base wall 32', and including a slot 88 for the flap 54'. The end wall 86 may then be turned upwardly and the end wall 38' turned downwardly for insertion of locking flap 54' into the slot 88. It will be appreciated that end wall 86 may be omitted, if preferred, with flap 54' being inserted between the roll support 30 and the bottom wall 32', for example, as indicated in Figure 5. The package may then be completed by folding reorder flap 58' over the top of the wall 44' and inserting its free end into the slot 60', as indicated in Figure 15.

As best seen in Figures 14 and 15, the front flap 52' (at the upper left in Figure 12) is shown as having an inclined edge 90 spaced from and defining with the adjacent edge 84 of flap 82 an opening or passageway 92 for the ribbon 28'.

To dispense ribbon from the slot 70', the ribbon will unwind from the bolt in the manner indicated in Figure 12; it will then pass through the opening 92, as indicated in Figure 15; and then it will pass between flap 82 and end wall 86, between the top walls 42' and 44' and out of the slot 70'. The ribbon will thus pass over edge 84 and through slot 70' in directions generally perpendicular thereto, as should be evident.

It will be appreciated that the flap 82 with the edge 84 will thus provide for a more gradual turning of the ribbon as it leaves the bolt and passes upwardly to dispensing slot 70', thereby enabling the ribbon to be dispensed vertically from a horizontal bolt with even less danger of twisting, turning or wrinkling of the ribbon.

The top wall 44' may be transversely perforated at 94, with converging and diverging curved slits 96 formed adjacent thereto, as shown. The perforation 94 will enable the top wall 44' to be conveniently folded therealong from its closed position of Figure 15 to a partially opened position providing access to the passageway 92 and the space between top walls 42', 44'. This will be useful, for example, when the ribbon is initially arranged for dispensing through slot 70' or when it is desired to change the type of dispensing, say from slot 72' to 70', and vice versa. The locking engagement of the curved portions 57' of ears 56' under the top wall 42' will hold down the rear of top wall 44' while the front portion may be folded upwardly along the perforated line 94.

The curved slits 96 will enable sales personnel or others to conveniently grip the box for removal from a compartment in the retail display counter (see Figure 1), for example, by inserting fingers into these slits.

To dispense from slot 72', the ribbon may be passed directly from the bolt behind flaps 82 and 52', through slot 72' and out the adjacent open corner of the package. Or, if desired, slot 72' may be omitted entirely and the ribbon passed directly between flaps 82 and 52' and through the adjacent corner of the box for lateral dispensing. The same is true for slot 72.

Figure 16:
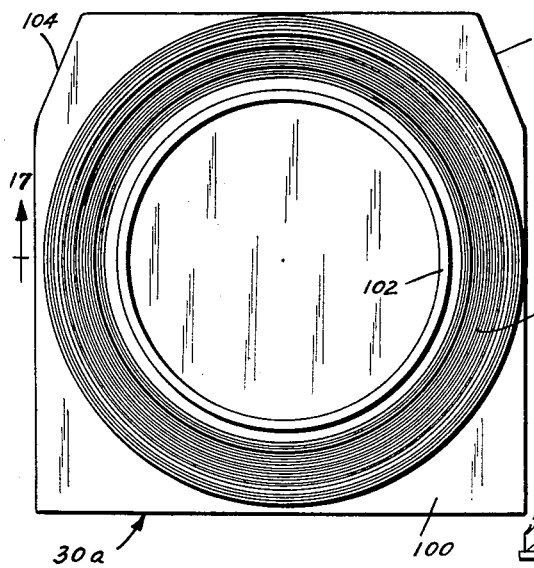
Figure 16 is a top plan view of another modification of the roll support and showing a roll of ribbon thereon.
Figure 17:
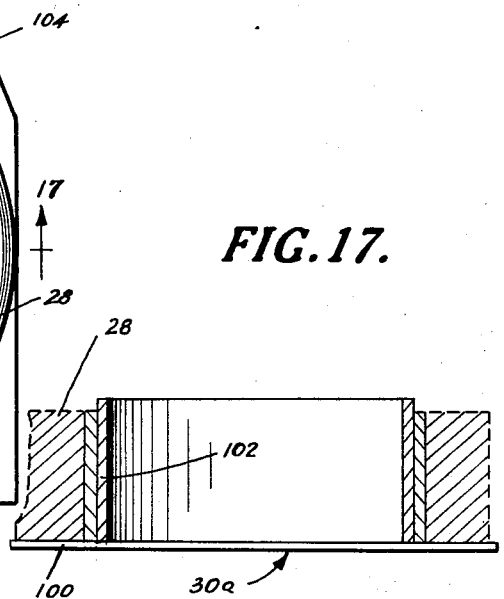
Figure 17 is a sectional view taken generally along line 17—17 of Figure 16.

Figures 16–19 illustrate further modifications of the roll support. In Figures 16, 17, the roll support 30a is shown as including a base member 100 corresponding generally to the shape of the bottom wall 32 or 32' of the box on which it will rest, and a cylindrical bearing 102 extending upwardly therefrom. Member 100 and bearing 102 may both be made of cardboard or any other suitable material, the bearing being secured to the member 100 in any appropriate manner, as by gluing. Two rounded corners 104 are provided on member 100, as shown, to facilitate insertion of the roll support into the box.

The bearing 102 is of a greater height than the height or thickness of the ribbon roll 28, as best seen in Figure 17. Preferably, the height of bearing 102 approximates the distance between the bottom and top walls of the closed box. The arrangement of this support 30a in the box should be evident.

Figure 18:
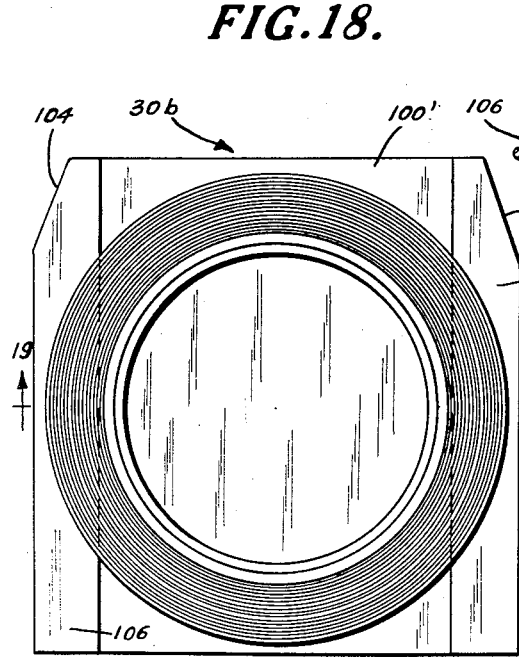
Figure 18 is a top plan view of a modification of the roll support of Figure 16.
Figure 19:
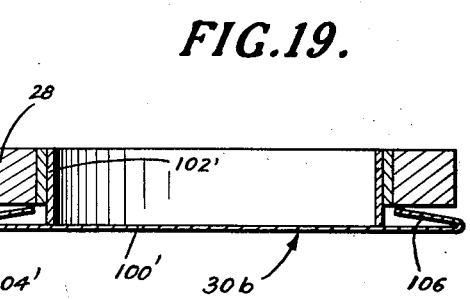
Figure 19 is a sectional view taken generally along the line 19—19 of Figure 18.

This modification is particularly advantageous when the ribbon package is arranged in a compartment on a display counter, as indicated in Figure 1, for vertically upward dispensing of the ribbon, inasmuch as the sales attendant may press down on the top wall of the box to hold it down while pulling the ribbon upwardly through the slot 70 or 70', as the case may be, without impeding the rotation of the ribbon roll. In other words, the higher bearing 102 will prevent the top wall of the box from being pressed against the ribbon roll 28 which would otherwise resist rotation or unwinding of the roll 28 and impair dispensing The roll support 30b shown in Figures 18 and 19 is somewhat similar to that of Figures 16 and 17, and hence, similar reference numerals will be used to represent similar parts. As best seen in Figure 19, roll support 30b includes two flaps 106 turned inwardly and upwardly from opposite sides of the base member 100'. Once again, the member 100' and bearing 102' may be formed of cardboard or other similar stiff but somewhat resilient material, with the bearing 102' appropriately secured to member 100', and with member 100' preferably being of the same general shape as the bottom wall of the box.

This support 30b is especially useful in connection with the dispensing of rolls of narrow ribbon, such as the roll 28 shown in Figure 19. The flaps 106 will inherently be urged upwardly, as a result of their resiliency, whereby an upward force will constantly be exerted on the roll of ribbon 28 by these flaps. The support 30b with the roll of ribbon thereon will be arranged in the box so that the member 100' rests on the bottom wall 32 or 32' with the bearing 102' extending toward the top wall, as is evident. The flaps 106 will urge the roll 28 against the top wall of the box and operate as a brake to prevent any excessively fast unwinding of the ribbon from the roll. Such fast unwinding is more apt to occur the narrower the ribbon, is as understood, and but for the flaps 106 or equivalent means might occur and cause overrun, tangles, etc. in the ribbon.

When dispensing the ribbon vertically upwardly from roll support 30b when the box is in the horizontal position of Figure 1, downward pressure applied against the top wall of the box by the attendant to keep it in place will not impede unwinding since bearing 102' will prevent any significant downward movement of the top wall, and since flaps 106 are sufficiently yieldable to provide a resilient mounting for the roll 28.

If desired, the flap 82 having the inclined edge 84 to allow a more gradual turning of the ribbon when it is dispensed through slot 70 may be provided on the roll support base member so as to be turned upwardly to the position thereof shown in Figure 15, rather than provided on the top wall 42', as shown.

It will be observed that, among other things, the present invention provides simple, inexpensive and durable ribbon package arrangements particularly designed to facilitate smooth and convenient dispensing of ribbon in a direction generally parallel to the axis of rotation of the roll from which the ribbon is unwound. In other words, the package arrangements of the invention may be disposed horizontally, as in Figure 1, and ribbon drawn therefrom vertically, without requiring any special winding or coiling of the ribbon in the box and without requiring any expensive or complicated mechanisms or structures.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. A display and dispensing package comprising a box and a roll of strip material such as ribbon or the like, said box being made of a relatively stiff but flexible material and including: a base wall; end walls; two opposed side walls joined at their bottoms to said base wall; a first top wall extending between and engaged to said side walls; a second top wall joined at at least one end to one of said end walls and extending over said first top wall and contiguous therewith; said base and top walls being parallel; said roll being disposed in said box; and means in said box rotatably supporting said roll for rotation about an axis perpendicular to said base and top walls.

2. The structure defined in claim 1 wherein at least one dispensing slot for said ribbon is formed in one of said side and top walls, and aligned openings being provided in said top walls for viewing the interior of the package.

3. The structure defined in claim 1 wherein a dispensing slot for said ribbon is formed in said second top wall, and said ribbon passing from said roll between said top walls and out said dispensing slot.

4. The structure defined in claim 1 and further comprising an inclined dispensing slot for said ribbon formed in said second top wall, a flap arranged in said package adjacent and parallel to one end wall thereof, said flap having an inclined end adjacent one of said side walls, and said ribbon passing from said roll over said inclined end of said flap between said top walls and out said dispensing slot.

5. The structure defined in claim 4 wherein the longitudinal axis of the ribbon is substantially perpendicular to said inclined end of said flap and said dispensing slot as said ribbon passes over the former and through the latter.

6. The structure defined in claim 4 wherein said flap having an inclined end is joined at its upper end to said first top wall.

7. The structure defined in claim 1 wherein said means in said box rotatably supporting said roll includes: a base member supported on said base wall; and a cylindrical bearing attached to said base member and extending upwardly toward said top walls; said roll being supported on said base member surrounding said bearing and of a height less than the height of said bearing.

8. The structure defined in claim 7 wherein means are formed on said base member resiliently engaging said roll biasing said roll upwardly to act as a partial brake during dispensing.

9. A display and dispensing package comprising a box and a roll of strip material such as ribbon or the like, said box being made of a relatively stiff but flexible material and including: a base wall; a top wall; end walls; and side walls; a dispensing slot in at least one of said walls; said roll having a hollow cylindrical core and being disposed within said box; means in said box rotatably supporting said roll for rotation about an axis perpendicular to said top and base walls, said means including: a base member made of a relatively stiff but flexible material, said base member being supported on said base wall; a plurality of tabs being hingedly joined to said base member at spaced regions lying along a circular path; said tabs normally extending upwardly from said base member and being continuously urged radially outwardly of said circular path; said roll resting on said base member with said core being resiliently engaged by and embracing said tabs.

10. The structure defined in claim 9 wherein said base member is of similar geometric outline to said base wall.

11. The structure defined in claim 10 wherein means are provided for disposing said base member above and parallel to said base wall and below said top wall.

12. The structure defined in claim 9 wherein said base member is of circular, disc-like configuration.

13. A dispensing package comprising a box and a roll of strip material such as ribbon or the like, said box being made of a relatively stiff but flexible material and including: a base wall; two opposed side walls hingedly joined at their bottoms to said base wall; a first top wall extending between and engaged to said side walls to resist lateral movement thereof; a second top wall extending over said first top wall and contiguous therewith; and end walls engaged to said base wall and said second top wall; a support in said box for said roll and including a base member being supported on and substantially congruent with said base wall; a plurality of tabs extending upwardly from said base member and being hingedly joined to said base member at spaced regions lying along a circular path; said roll being disposed in said box between said base and top walls and resting on said base member, said roll including a hollow cylindrical core embracing said tabs, and said tabs forming a bearing for said roll whereby said roll is rotatable in said box about an axis perpendicular to said base wall.

14. A box for containing a roll of material, said box comprising: a base wall; two opposed side walls hingedly joined at their bottoms to said base wall; a first top wall parallel to and spaced from said base wall; means for engaging said top wall to the tops of said side walls to resist lateral movement of said side walls; a second top wall overlying and adjacent to said first top wall; end walls hingedly joined at their tops to said second top wall; one of said end walls being hingedly joined at its bottom to said base wall; and a flap hingedly joined to the bottom of the other of said end walls and adapted to be engaged to the interior of said base wall; said first top wall being hingedly joined at one end thereof to the top of one of said side walls; a tongue being provided at the other end of said first top wall; a flap on the top of the other of said side walls, and said flap having a slit therein for reception of said tongue.

15. The structure defined in claim 14 wherein aligned viewing openings are provided in said top walls, and further wherein a dispensing slot is formed in one of said side and top walls.

References Cited in the file of this patent

UNITED STATES PATENTS

| | | |
|---|---|---|
| 2,237,920 | Armitt | Apr. 8, 1941 |
| 2,582,422 | Ewald | Jan. 15, 1952 |
| 2,631,034 | Eddy | Mar. 10, 1953 |
| 2,765,907 | Dunning et al. | Oct. 9, 1956 |